United States Patent [19]

Tacke

[11] Patent Number: 4,585,596
[45] Date of Patent: Apr. 29, 1986

[54] PROCESS FOR THE PRODUCTION OF AROMATIC POLYESTER CARBONATES IN THE ABSENCE OF TERTIARY AMINES

[75] Inventor: Peter Tacke, Krefeld, Fed. Rep. of Germany

[73] Assignee: Bayer Aktiengesellschaft, Leverkusen-Bayerwerk, Fed. Rep. of Germany

[21] Appl. No.: 648,122

[22] Filed: Sep. 6, 1984

[30] Foreign Application Priority Data

Sep. 20, 1983 [DE] Fed. Rep. of Germany ....... 3333864

[51] Int. Cl.$^4$ ................. C07C 68/00; C07C 69/96; C08G 63/62; C08G 63/64
[52] U.S. Cl. ................................................. 260/463
[58] Field of Search ......................................... 260/463

[56] References Cited

U.S. PATENT DOCUMENTS

| | | | |
|---|---|---|---|
| 3,220,976 | 11/1965 | Goldberg | 528/173 X |
| 3,959,335 | 5/1976 | Vernaleken et al. | 260/463 |
| 3,966,785 | 7/1976 | Krimm et al. | 260/463 |
| 4,107,143 | 5/1978 | Inata et al. | 528/176 |
| 4,130,548 | 12/1978 | Kochanowski | 528/176 |
| 4,260,731 | 4/1981 | Mori et al. | 528/194 X |
| 4,286,083 | 8/1981 | Kochanowski | 528/173 X |

FOREIGN PATENT DOCUMENTS 1173998 9/1984 Canada.

Primary Examiner—John E. Kittle
Assistant Examiner—Mukund J. Shah
Attorney, Agent, or Firm—Connolly and Hutz

[57] ABSTRACT

Bis-chlorocarbonic acid esters of diphenols react with aromatic dicarboxylic acids in the melt or in high-boiling, inert organic solvents, even in the absence of bases, such as tertiary amines for example, to form polyester carbonates.

4 Claims, No Drawings

PROCESS FOR THE PRODUCTION OF AROMATIC POLYESTER CARBONATES IN THE ABSENCE OF TERTIARY AMINES

This invention relates to a process in which aromatic dicarboxylic acids are reacted with bis-chlorocarbonic acid esters of diphenols in the melt or in high-boiling inert solvents to form polyester carbonates, the reaction being accompanied by the evolution of hydrogen chloride and carbon dioxide.

Aromatic polyester carbonates are known. They combine the advantageous properties of aromatic polyesters and aromatic polycarbonates. Various methods are available for the production of aromatic polyester carbonates.

The melt transesterification process according to DE-AS No. 27 04 315 is attended by the disadvantage that the products formed are not colorless.

DE-OS No. 27 58 030 and U.S. Pat. No. 4,130,548 relate to interfacial processes which, although giving colorless products, are accompanied by the formation, as secondary products of large quantities of alkali chloride which is becoming increasingly more difficult to eliminate on ecological grounds.

Published European Patent Application No. 10 840 describes an interfacial process and a solution process for the production of polyester carbonates. The foregoing observations apply to the interfacial process; the viability of the solution process depends inter alia on whether the tertiary amine used as solvent and acid acceptor can be recovered. However, recovery of the tertiary amines is accompanied by the accumulation of large quantities of alkali chloride.

U.S. Pat. No. 3,220,976 describes the reaction of bis-chlorocarbonic acid esters of diphenols with aromatic dicarboxylic acids in tertiary amines as solvents and acid acceptors. In this case, too, large quantities of alkali chloride accumulate during recovery of the amines.

It has surprisingly been found that bis-chlorocarbonic acid esters of diphenols react with aromatic dicarboxylic acids in the melt or in high-boiling inert solvents, even in the absence of bases, such as tertiary amines for example, to form polyester carbonates, the reaction being accompanied by the evolution of hydrogen chloride and carbon dioxide. The hydrogen chloride obtained as secondary product is a much more valuable raw material than alkali chloride.

Accordingly, the present invention provides a process for the production of fully aromatic polyester carbonates from aromatic dicarboxylic acids and bis-chlorocarbonic acid esters of diphenols, optionally branching agents and optionally chain terminators, characterized in that from 0.95 to 3 moles, preferably from 1.1 to 2 moles and, more preferably, from 1.2 to 1.8 moles of bis-chlorocarbonic acid esters are reacted per mole of aromatic dicarboxylic acid in the absence of basic solvents and optionally in the presence of catalysts either in the melt or in an inert organic solvent having a boiling point above 130° C. and at temperatures in the range from 130° to 250° C. and preferably at temperatures in the range from 160° to 210° C.

Preferred aromatic dicarboxylic acids are iso- and terephthalic acid. In one preferred embodiment, they are used in a ratio of from 7:3 to 3:7.

Bis-chlorocarbonic acid esters of bisphenols are known. They may be produced, for example, in accordance with DE-OS Nos. 24 10 668 or 24 10 743.

Preferred diphenols are, for example, those of the type described in DE-OS No. 30 07 934. Particularly preferred diphenols are bisphenol-A, tetramethyl bisphenol-A, 1,1-bis-(4-hydroxyphenyl)-isobutane and -cyclohexane, 4,4'-dihydroxydiphenylsulfide and sulfone and di- and tetrahalogenated derivatives thereof.

Preferred branching agents are also described in DE-OS No. 30 07 934.

Preferred chain terminators for limiting molecular weight are aliphatic and aromatic monocarboxylic acids and also monophenols, chlorocarbonic acid esters of monophenols and acid chlorides or aromatic monocarboxylic acids. The aromatic rings of the chain terminators may contain up to 2 branched and/or unbranched alkyl substituents each containing from 1 to 18 carbon atoms. The chain terminators may be used in quantities of from 1 to 10 mole percent and preferably in quantities of from 2 to 6 mole percent, based on the bis-chlorocarbonic acid esters used. Chain terminators and branching agents may optionally be used, during the post-condensation stage.

Preferred inert organic solvents are, for example, chlorobenzene, dichlorobenzenes, xylenes, mesitylene, diphenylether.

The process according to the invention may be catalyzed by metal halides, metal oxides, phosphorus compounds and sulfur in quantities of from 0.01 to 1% by weight, based on the aromatic dicarboxylic acid used. Particularly preferred catalysts are, for example, copper-(II) chloride, zinc chloride, magnesium chloride, manganese-(II) chloride, calcium chloride, tin-(II) chloride, arsenic chloride, antimony-(II) and antimony-(V) chloride, iron-(III) chloride, cobalt chloride, nickel chloride, antimony trioxide, phosphorus trichloride, phosphorus oxychloride, triphenyl phosphine.

Any reaction component used in excess is left over on completion of the reaction. Where an excess of bis-chlorocarbonic acid ester is used, free chlorocarbonyloxy groups are still present after the reaction, making the reaction product unsuitable for direct use. In cases such as these, post-condensation by the interfacial process, as described for example in DE-OS No. 30 07 934, is recommended.

The polyester carbonates produced by the process according to the invention may contain up to 10 mole percent, based on the sum of ester and carbonate groups, of anhydride groups.

The content of carbonate groups is essentially determined by the ratio of aromatic dicarboxylic acid to bis-chlorocarbonic acid ester and is generally between 20 and 35 mole percent, based on the sum of ester and carbonate groups. However, it may be further increased by a subsequent interfacial process.

The polyester carbonates produced by the process according to the invention may be injection-molded to form moldings or extruded to form semifinished articles by standard methods, optionally after the addition of stabilizers, flow promoters, plasticizers, mold release agents, fillers and reinforcing materials such as, for example, glass fibers, glass beads, asbestos and carbon fibers, kieselguhr, kaolin, crushed rock and pigments.

EXAMPLES

Example 1

353 g (1 mole) of bis-chlorocarbonic acid ester of bisphenol A, 66.5 g of iso- and 66.5 g of terephthalic acid (0.4 mole of each) and quantities of 0.1 g of antimony trioxide and triphenyl phosphine are introduced into a glass flask equipped with a stirrer and gas outlet pipe and, after melting of the bis-chlorocarbonic acid ester, the mixture is stirred for 6 hours at 190° C. Hydrogen chloride and carbon dioxide escaped in large quantities. The dicarboxylic acids initially dispersed in the melt slowly dissolved.

The melt solidified on cooling to form a brittle solid which dissolved almost completely in 4 liters of dichloromethane. After residual dicarboxylic acid had been filtered off, 35 g of bisphenol A bis-chlorocarbonic acid ester, 3 g of triethylamine, 5 g of p-tert.-butylphenol (3 mole percent, based on the bis-chlorocarbonic acid ester used) and 7 liters of water were added to the filtrate. The pH-value of the aqueous phase was adjusted to pH 12–13 by the addition of aqueous NaOH with vigorous stirring of the mixture and kept at that level for 30 minutes.

After separation of the phases, the organic phase was neutralized with dilute phosphoric acid and then washed with water until free from electrolyte. Separation of the polyester carbonate obtained was carried out by precipitation with cyclohexane from the dichloromethane solution concentrated to a solids content of 15% by weight.

The almost colorless product precipitated in fine-grained form had a relative viscosity (as measured on a solution of 0.5 g of substance in 100 ml of dichloromethane) of 1.283.

A glass temperature of 178° C. was measured by differential thermoanalysis.

The product had an ester group content of 68.7 mole percent, based on the sum of ester and carbonate groups.

Example 2

In a reaction carried out in the same way as in Example 1, 500 ml of a mesitylene mixture were added during the first stage, keeping the reaction temperature to approximately 165° C. In this case, the reaction time was 16 hours. The reaction mixture was then diluted with the quantity of dichloromethane indicated in Example 1 and further processed in the same way as in that Example.

The polyester carbonate obtained had a relative viscosity of 1.267 and a glass temperature of 176° C.

What is claimed is:

1. A process for the production of fully aromatic polyester carbonates from aromatic dicarboxylic acids and bis-chlorocarbonic acid esters of diphenols which comprises heating from 0.95 to 3 moles of bis-chlorocarbonic acid ester per mole of aromatic dicarboxylic acid, with said acid in the absence of an amine to temperatures from 130° to 250° C. either in the melt or in an organic solvent inert in the process having a boiling point above 130° C.

2. A process as claimed in claim 1, characterized in that from 1.1 to 2 moles of bis-chlorocarbonic acid ester are used per mole of aromatic dicarboxylic acid.

3. A process as claimed in claim 1, characterized in that from 1.2 to 1.8 moles of bis-chlorocarbonic acid ester are used per mole of aromatic dicarboxylic acid.

4. A process as claimed in claim 1, characterized in that the temperature is in the range from 160° to 210° C.

* * * * *